(12) United States Patent
Lin et al.

(10) Patent No.: US 11,320,601 B2
(45) Date of Patent: May 3, 2022

(54) LOCKING ARRANGEMENTS FOR PLUGGABLE OPTICAL SUBASSEMBLY MODULES

(71) Applicant: Applied Optoelectronics, Inc., Sugar Land, TX (US)

(72) Inventors: Kai-Sheng Lin, Sugar Land, TX (US); John Cheng, Houston, TX (US); Ziliang Cai, Richmond, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 17/031,392

(22) Filed: Sep. 24, 2020

(65) Prior Publication Data

US 2022/0091345 A1 Mar. 24, 2022

(51) Int. Cl.
*G02B 6/38* (2006.01)
*H04B 10/40* (2013.01)
*G02B 6/42* (2006.01)

(52) U.S. Cl.
CPC ........... *G02B 6/3826* (2013.01); *G02B 6/387* (2013.01); *G02B 6/4261* (2013.01); *H04B 10/40* (2013.01)

(58) Field of Classification Search
CPC ............. H04B 10/40; G02B 6/38; G02B 6/42
See application file for complete search history.

(56) References Cited

U.S. PATENT DOCUMENTS 9,377,591 B1 * 6/2016 Su ........................ G02B 6/3893
2012/0106902 A1 * 5/2012 Thirugnanam ...... G02B 6/4292
385/92

* cited by examiner

*Primary Examiner* — Tina M Wong
(74) *Attorney, Agent, or Firm* — Grossman Tucker Perreault & Pfleger, PLLC; Norman S. Kinsella

(57) ABSTRACT

In general, the present disclosure is directed to locking arrangements for use with optical subassembly housings, such as small form-factor pluggable (SFFP) housings, that include a handle member configured to rotate about the housing to allow a user to select a target/desired orientation. Preferably, the locking arrangement couples to a pluggable housing that is configured to removably couple into a receptacle of an optical transceiver cage or other suitable enclosure. The locking arrangement further includes a handle member rotatably coupled to the pluggable housing, the handle member being configured to allow the pluggable housing to releasably lock within the receptacle. The handle member is also preferably configured to maintain a user-selected orientation such that the handle member remains at a given angle relative to the pluggable housing in the absence of a user-supplied force.

17 Claims, 11 Drawing Sheets

LOCKING ARRANGEMENTS FOR PLUGGABLE OPTICAL SUBASSEMBLY MODULES

RELATED APPLICATIONS

The present disclosure is related to co-pending application Ser. No. 17/031,362 titled "LOCKING ARRANGEMENTS FOR PLUGGABLE OPTICAL SUBASSEMBLY MODULES" which was concurrently filed with the instant application and is incorporated herein by reference in its entirety.

TECHNICAL FIELD

The present disclosure generally relates to optical communications, and more particularly, to locking arrangements for use with small-form factor pluggable transceiver housings that include a handle member configured to rotate and transition between a plurality of user-selectable positions/orientations.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more transmitter optical subassemblies (TOSAs) and receiver optical subassemblies (ROSAs) for transmitting and receiving optical signals, respectively. Some optical transceiver systems use cage-type mountings that provide receptacles for receiving pluggable transceiver modules. As optical transceiver technology continues to scale, mechanisms for retaining pluggable optical transceiver modules raise challenges due to the space constraints of the cages and optical transceiver modules as well as the ever-increasing desire to increase cage density, e.g., channel count per square inch.

BRIEF DESCRIPTION OF THE DRAWINGS

These and other features and advantages will be better understood by reading the following detailed description, taken together with the drawings wherein.

DETAILED DESCRIPTION

Figure 1:
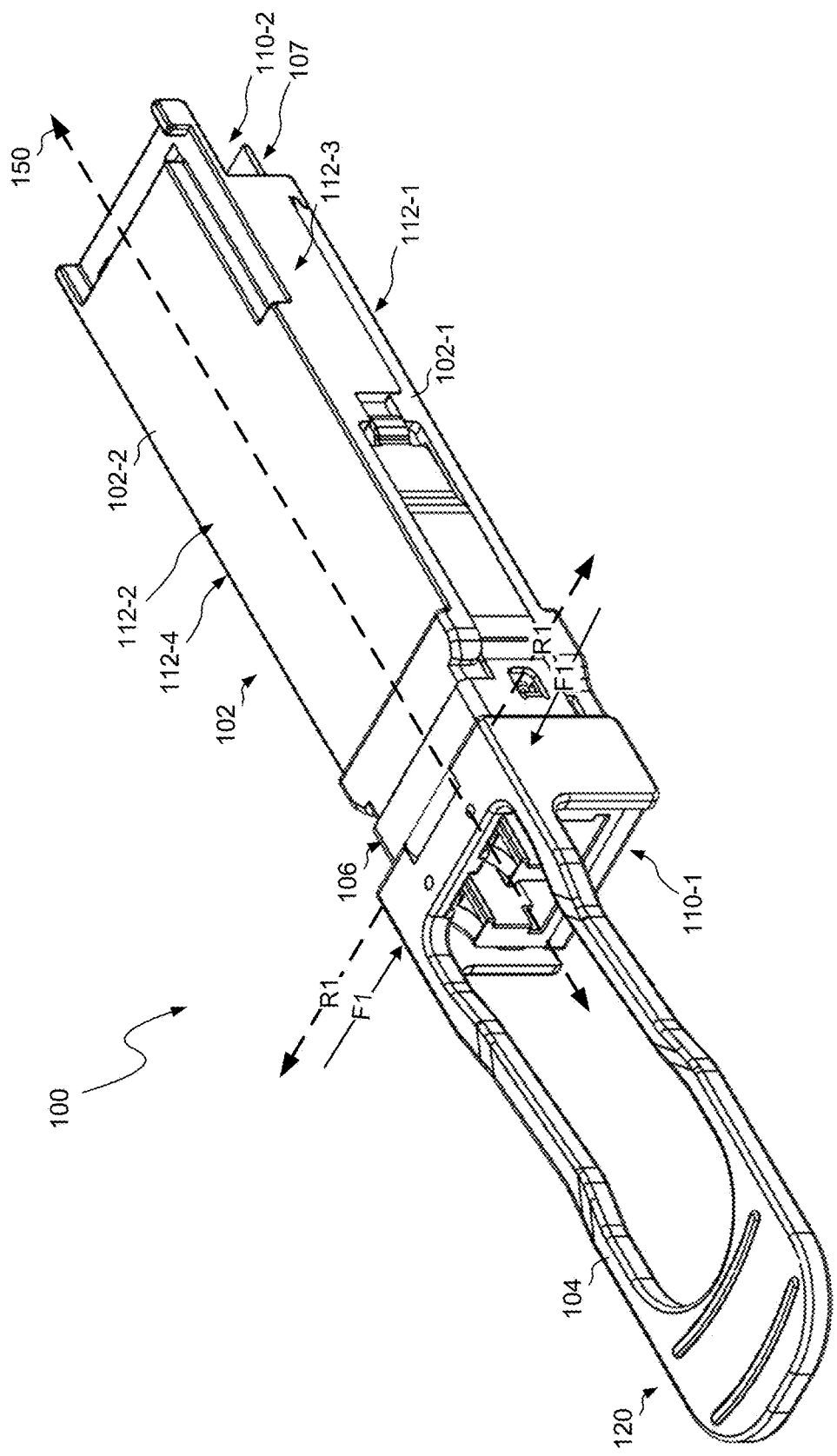
FIG. 1 shows a perspective view of an optical transceiver module consistent with embodiments of the present disclosure.

In general, the present disclosure is directed to locking arrangements for use with optical subassembly housings, such as small form-factor pluggable (SFFP) housings, that include a handle member configured to rotate about the housing to allow a user to select a target/desired orientation. Preferably, the locking arrangement couples to a pluggable housing that is configured to removably couple into a receptacle of an optical transceiver cage or other suitable enclosure. The pluggable housing also preferably defines a cavity to receive an optical component, such as one or more laser diodes (LDs), laser diode drivers (LDDs), photodiodes (PDs), transimpedance amplifiers (TIAs), and so on. The locking arrangement further includes a handle member rotatably coupled to the pluggable housing, the handle member being configured to allow the pluggable housing to releasably lock within the receptacle. The handle member is also configured to rotate relative to the locking arrangement, and thus by extension the pluggable housing, to transition the handle member between at least a first user-selected orientation and a second user-selected second orientation (which may also be referred to herein as simply first and second orientations). The handle member is also preferably configured to maintain a user-selected orientation such that the handle member remains at a given angle relative to the pluggable housing in the absence of a user-supplied force.

In one specific, non-limiting example embodiment a locking arrangement is disclosed for use with an optical transceiver module. The optical transceiver module preferably includes a pluggable housing that defines a cavity to receive an optical component, and that is configured to removably couple into a receptacle of an optical transceiver cage or other suitable enclosure. The locking arrangement coupled to the pluggable housing is preferably configured to allow the pluggable housing to releasably lock within the receptacle. The locking arrangement also preferably includes a lock actuator coupled to the pluggable housing that is configured to transition the pluggable housing between a locked and unlocked orientation, the locked orientation to prevent removal of the pluggable housing from the receptacle of the optical transceiver cage and the unlocked orientation to allow removal of the pluggable housing from the receptacle of the optical transceiver cage. The locking arrangement also further preferably includes a handle member rotatably coupled to the lock actuator that is configured to rotate relative to the pluggable housing to transition the handle member between at least a first orientation and a second orientation, and wherein the handle member is configured to maintain the handle member at the first orientation or the second orientation based on a bias force supplied by the handle member against the lock actuator.

Thus, in this preferred example, the handle member can maintain the user-selected orientation based at least in part on a bias force supplied by the handle member against the lock actuator to generate friction therebetween that is sufficient to "hold" the handle member in place.

In another specific, non-limiting preferred example a locking arrangement for use with an optical transceiver module is disclosed. The optical transceiver module preferably includes a pluggable housing defining a cavity to receive an optical component and is configured to removably couple into a receptacle of an optical transceiver cage or other suitable enclosure. The locking arrangement couples to the pluggable housing to allow the pluggable housing to releasably lock within the receptacle. The locking arrangement preferably includes a lock actuator coupled to the pluggable housing that is configured to transition the pluggable housing between a locked and unlocked orientation, the locked orientation to prevent removal of the pluggable housing from the receptacle of the optical transceiver cage and the unlocked orientation to allow removal of the pluggable housing from the receptacle of the optical transceiver cage. The locking arrangement further preferably includes the lock actuator having a body and first and second handle coupling members extending therefrom that define a first axis of rotation. The handle member also preferably defines first and second slots to receive the first and second handle coupling members of the lock actuator, respectively, and is configured to rotate about the first axis of rotation to transition the handle member between at least a first orientation and a second orientation.

Thus, in this preferred example, the handle member and lock actuator rotatably couple together via an internal hinge that is provided at least in part by the aforementioned first and second slots of the handle member. More preferably, the internal hinge also includes a tongue and groove arrangement whereby a recess/groove provided within each of the first and second slots of the handle member can receive respective protrusions of the first and second handle coupling members of the lock actuator to maintain the handle member at a user-selected angle/orientation such that, in the absence of a user-supplied force, the handle member remains extending from the housing at the user-selected angle/orientation.

Numerous advantages over other locking arrangement approaches will be apparent in light of the following disclosure. For example, a pluggable housing consistent with aspects of the present disclosure can provide a handle member that may be repositioned by a user to allow for access to, for instance, optical coupling ports for insertion and removal of an optical coupler such as an LC connector during maintenance/installation procedures. Moreover, consider an example scenario where pluggable housings are stacked in a so-called "belly-to-belly" orientation whereby a first pluggable housing is disposed atop a second pluggable housing, with the second pluggable housing being inverted/flipped relative to the first pluggable housing. In this configuration, each of the first and second pluggable housings can include a handle member configured consistent with the present disclosure to allow for a user to rotate each respective handle member away from each other to a second orientation, e.g., in a butterfly fashion, to gain access to respective optical coupling ports during maintenance procedures. The user may then subsequently rotate the handle members of the first and second pluggable housings towards each other to transition from the second orientation to the first orientation after performing the maintenance procedures.

In addition, a locking arrangement consistent with aspects of the present disclosure can include the above-discussed internal hinge to provide a relatively low-profile locking arrangement. Some approaches to locking arrangements include hinges with metal pins and other such hinge components mounted to the top, e.g., such as shown in FIG. 1, or bottom of a transceiver housing. These hinge approaches increase the overall dimensions and resulting footprint of the transceiver housing. A transceiver housing implementing a locking arrangement consistent with the present disclosure can achieve smaller overall dimensions, and thus by extension a reduced overall footprint, based on having an internal hinge for rotatably coupling the handle member to the transceiver housing.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the target/stated characteristic. To provide one non-limiting numerical example to quantify "substantially," minor variation may cause a deviation of up to and including ±5% from a particular stated quality/characteristic unless otherwise provided by the present disclosure.

Turning to the Figures, FIGS. 1-4 show an example optical transceiver module 100 consistent with aspects of the present disclosure. Note, this disclosure is not necessarily limited to transceiver modules and is equally applicable to other optical modules with housings that can removably couple within an associated equipment cage/enclosure such as transmit and receive-only optical modules. The terms "equipment cage" and "transceiver cage" may be used interchangeably herein to refer to any cage/enclosure that can hold and preferably removably couple to one or more transceiver, transmit-only, and/or receive-only optical modules.

As shown, the optical transceiver module 100 includes a housing 102. The housing 102 preferably comprises a small form-factor pluggable (SFFP) housing configured to removably coupled into a transceiver housing or other enclosure via a locking arrangement collectively provided by a handle member 104 and a lock actuator 106, as discussed in greater detail below. The housing 102 may also be referred to herein as a pluggable transceiver housing, or simply a pluggable housing.

The housing 102 preferably comprises zinc alloy or any other suitably rigid material. The handle member 104 preferably comprises polyamide (common referred to as PA material), although other materials are within the scope of this disclosure including thermoplastic elastomers. The lock actuator 106 preferably comprises stainless steel or any other suitably rigid material. More preferably, the handle member 104 comprises a relatively flexible material, such as a plastic, and the lock actuator 106 comprises a metal.

The housing 102 is preferably implemented as a multi-part housing that includes at least a first housing portion 102-1 and a second housing portion 102-2. In this example, the first and second housing portions 102-1, 102-2 are configured to couple together and define a cavity therebetween (not shown) for receiving components such as TOSA and ROSA components shown in the optical transceiver system 1200 of FIG. 12. The first housing portion 102-1 may also be referred to herein as a base, and the second housing portion 102-2 may also be referred to herein as a lid or cover portion.

Preferably, the housing 102 extends along a longitudinal axis 150 from a first end 110-1 to a second end 110-2. In this example, the first and second housing portions 102-1, 102-2 provide first and second sidewalls 112-1, 112-2, respectively. The first and second sidewalls 112-1, 112-2 may also be referred to herein as bottom and top sidewalls, respectively. The first and second housing portions 102-1, 102-2 also preferably provide lateral sidewalls 112-3, 112-4 (which may also be referred to herein as third and fourth sidewalls) that extend transverse from the first and second sidewalls 112-1, 112-2.

A first end 110-1 of the housing 102 can provide one or more optical coupling ports, such as LC coupling portions as shown, for optically coupling with external transit and receive optical fibers such as the transit and receive optical fibers 1233, 1234 discussed below with reference to FIG. 12. Accordingly, the first end 110-1 of the housing 102 may also be referred to herein as an optical coupling end.

The second end 110-2 of the housing 102 can provide, for example, a printed circuit board 107 partially extending from the housing 102 to allow for electrical communication with external driving circuitry. Preferably, the printed circuit board 107 implements at least a portion of the transmit and receive connecting circuits 1212, 1232 respectively (See FIG. 12). Thus, the second end 110-2 of the housing 102 may be inserted into a transceiver cage, which may also be referred to herein as a cage, and electrically coupled to circuitry of the same based on the printed circuit board 107. Accordingly, the second end 110-2 of the housing 102 may also be referred to herein as an electrical coupling end.

Preferably, the lateral sidewalls 112-3, 112-4 of the housing 102 each define a channel/slot, e.g., channel 111-1 (See FIG. 2), to receive arms of the lock actuator 106. The channels preferably allow the lock actuator 106 to be disposed flush with the housing 102 to limit the overall width of the housing 102. In addition, the channels preferably provide a mechanical guide that confines the lock actuator 106 and allows for the same to be displaced and transitioned between a locked and unlocked orientation, e.g., based on linear movement, as discussed further below.

The lateral sidewalls 112-3, 112-4 also optionally define handle openings, e.g., handle opening 129-1. The handle openings can be configured to allow for coupling of, for instance, a bail handle that can rest atop the second sidewall 102-2 of the housing 102. More preferably, the handle openings can define a rotational axis that allows for such handles to rotate about the housing 102. Such handles may be referred to as low-profile handles which can include a spring member to return a bail handle to a position atop the second sidewall 102-2 of the housing 102 in the absence of a user supplied force.

One such example bail handle configuration is shown and described in greater detail in U.S. application Ser. No. 16/167,864 entitled "Locking Arrangement For Pluggable Optical Subassembly Modules." Thus, the bail handle may be kept relatively flush against the housing 102 in the absence of a user-supplied force to avoid having the bail handle extending from the housing 102 or otherwise increasing the footprint of the same. The housing 102 preferably includes the handle openings to support both the aforementioned low-profile bail handles and other handle types such as the handle member 104 implemented as a paddle-type handle as shown in FIG. 1 without requiring modification of the housing 102. The handle openings may therefore be present but not unused, e.g., not used to support coupling of the handle member 104 to the housing 102 and/or rotation of the handle member 104 relative to the same, when implementing the housing 102 with handle members consistent with the present disclosure.

Figure 2:
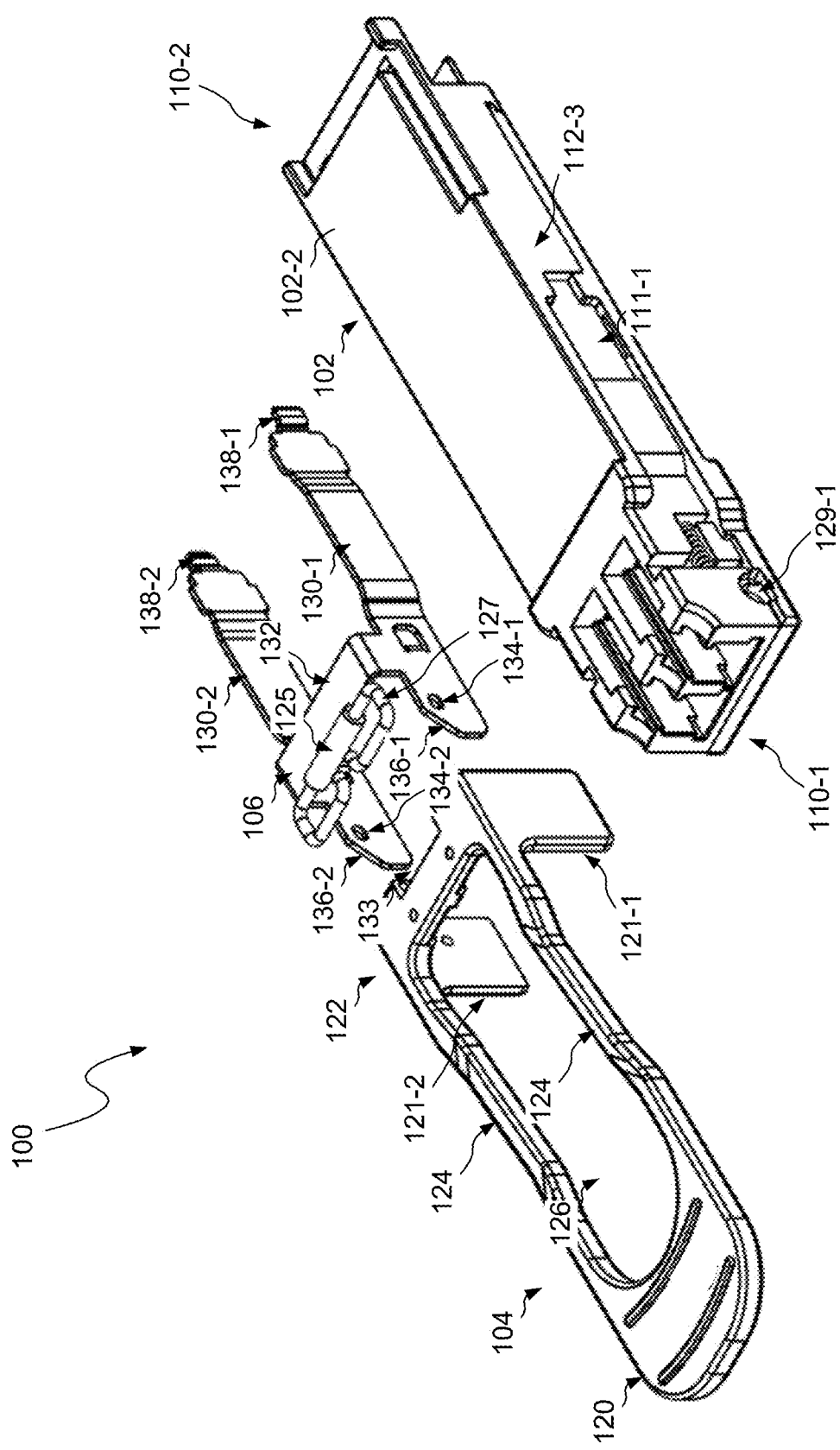
FIG. 2 shows a partially-exploded view of the optical transceiver module of FIG. 1 in accordance with an embodiment.
Figure 3:
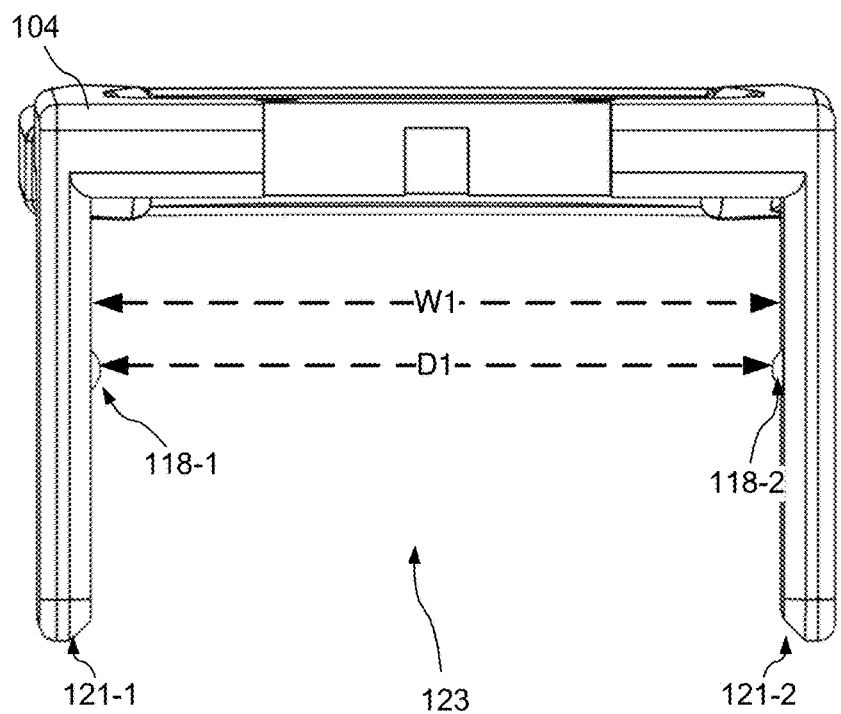
FIG. 3 shows a handle member of the optical transceiver module of FIG. 1 in isolation, in accordance with an embodiment.
Figure 4:
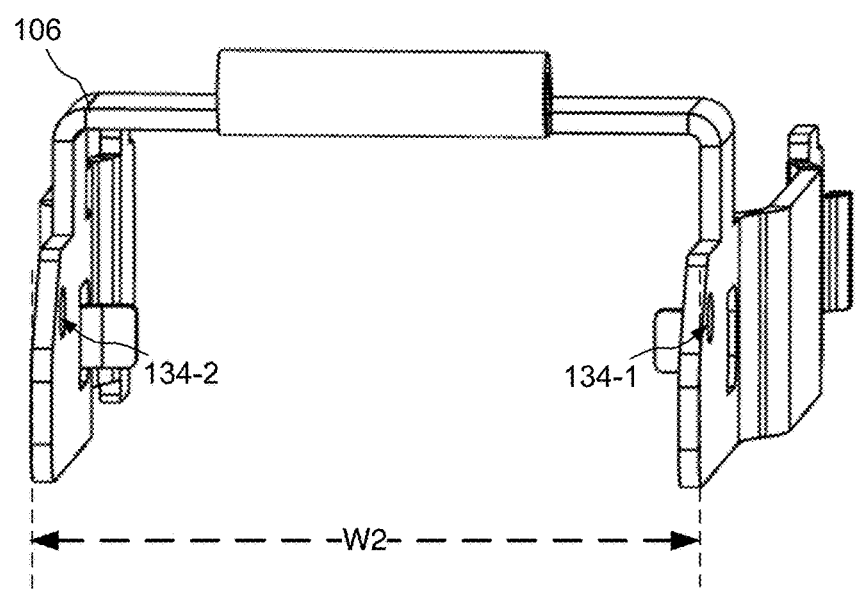
FIG. 4 shows a lock actuator of the optical transceiver module of FIG. 1 in isolation, in accordance with an embodiment.

Preferably, the handle member 104 includes a grip portion 120 disposed adjacent a first end and a coupling region shown generally at 122 (See FIG. 2) that is disposed adjacent a second end. The grip portion 120 is preferably coupled to the coupling region 122 via support members 124 (FIG. 2). Support members 124 preferably define a slot/opening 126 that is configured to allow a user to insert one or more fingers into the same when gripping the grip portion 120. The slot/opening 126 also provides convenient access to, for instance, the optical coupling ports at the first end 110-1 of the housing 102 as well as increased air flow through the handle member 104 which can be particularly important in high-density applications that include, for instances, tens or hundreds of optical transceiver modules within a confined space.

With specific reference to FIG. 2, the handle member 104 preferably further includes first and second arms 121-1, 121-2 that extend substantially transverse from the coupling region 122 of the handle member 104 and the support members 124. More preferably, the first and second arms 121-1, 121-2 extend substantially parallel with each other and define a slot 123 therebetween with an overall width of W1 to receive a portion of the lock actuator 106 and the housing 102 (See FIG. 3). For example, and as shown more clearly in FIG. 3, the slot 123 includes an overall width W1 that is slightly smaller or equal to the overall outer width W2 (See FIG. 4) of the lock actuator 106 such that the first and second arms 121-1, 121-2 of the handle member 104 can supply a bias force F1 against opposite sides of the lock actuator 106 (See FIG. 1).

More preferably, first and second projections 118-1, 118-2 of the first and second arms 121-1, 121-2, respectively, define a portion of the slot 123. The first and second projections preferably include a round profile, although other shapes and profiles are within the scope of this disclosure. The first and second projections 118-1, 118-2 may also be referred to herein as first and second detents, respectively.

As shown, the first and second projections 118-1, 118-2 preferably extend into the slot 123 and have an offset distance of D1 disposed between each other. Preferably, the offset distance D1 is less than the overall outer width W2 of the lock actuator 106 (See FIG. 4) and cause the first and second projections 118-1, 118-2 to supply the bias force F1 against opposite sides of the lock actuator 106 when the same is disposed therebetween.

Returning to FIG. 2, the coupling region 122 of the handle member 104 defines a slot 133, which may also be referred to herein as a notch. The slot 133 is configured to receive at least a portion of a cylindrical portion 125 provided by the lock actuator 106. The coupling region 122 may also define a cavity (not shown) in communication with the slot 133. A pin 127 may then extend through an aperture provided by the cylindrical portion 125 and into the cavity via the slot 133. The slot 133 provided by the coupling region 122 of the handle member 104, the cylindrical portion 125, and the pin 127 may then collectively provide a hinge. The hinge can then define a first axis of rotation R1 (see FIG. 1) about which the handle member 104 can rotate relative to the housing 102. The first axis of rotation R1 preferably extends transverse relative to the longitudinal axis 150 of the housing 102. Notably, the first axis of rotation R1 is disposed offset from an axis of rotation defined by the handle openings, e.g., handle opening 129-1, discussed above, and preferably the first axis of rotation R1 extend substantially parallel with the axis of rotation defined by the handle openings.

The handle member 104 is preferably configured to rotate relative to the housing 102 from a first orientation (See FIG. 1) to a second orientation (See FIG. 6) based on the first axis of rotation R1, as is discussed in detail further below. More preferably, the handle member 104 is configured to rotate between a plurality of orientations in this manner and allow for a user to select the particular angle of the handle member 104 such that the handle member 104 remains at a desired/selected angle relative to the housing 102 in the absence of a user-supplied force.

As shown, the lock actuator 106 includes first and second locking arms 130-1, 130-2 that extend substantially parallel with each other and an adjoining portion 132 that extends between the same. The first and second locking arms 130-1, 130-2 are configured to be disposed proximate the lateral sidewalls 112-3, 112-4 of the housing, and preferably, within the channels defined by the lateral sidewalls 112-3, 112-4, e.g., channel 111-1 (See FIG. 2).

Each of the first and second locking arms 130-1, 130-2 preferably include a first end that extends to a second end. Adjacent the first end, the first and second locking arms 130-1, 130-2 further preferably define first and second engagement slots 134-1, 134-2, respectively. The first and second engagement slots 134-1, 134-2 are preferably aligned such that an imaginary line drawn along an axis extends through each of the first and second slots 134-1, 134-2. The first and second engagement slots 134-1, 134-2 are also preferably defined by an inner surface configured to (directly) engage with the first and second projections 118-1, 118-2 (See FIG. 3) of the handle member 104 to act as a mechanical stop when, for instance, a user transitions the handle member 104 to the first orientation. The first and second projections 118-1, 118-2 and respective first and second engagement slots 134-1, 134-2 may also be described as a tongue and groove arrangement.

The first end of each of the first and second locking arms 130-1, 130-2 further preferably define first and second angled engagement surfaces 136-1, 136-2. The first and second angled engagement surfaces 136-1, 136-2 are preferably configured to maintain the handle member 104 at the second orientation by operating as a mechanical stop that (directly) engages the first and second projections 118-1, 118-2 of the handle member 104 when, for instance, the handle member 104 is in the second orientation (see FIG. 6).

Figure 7:
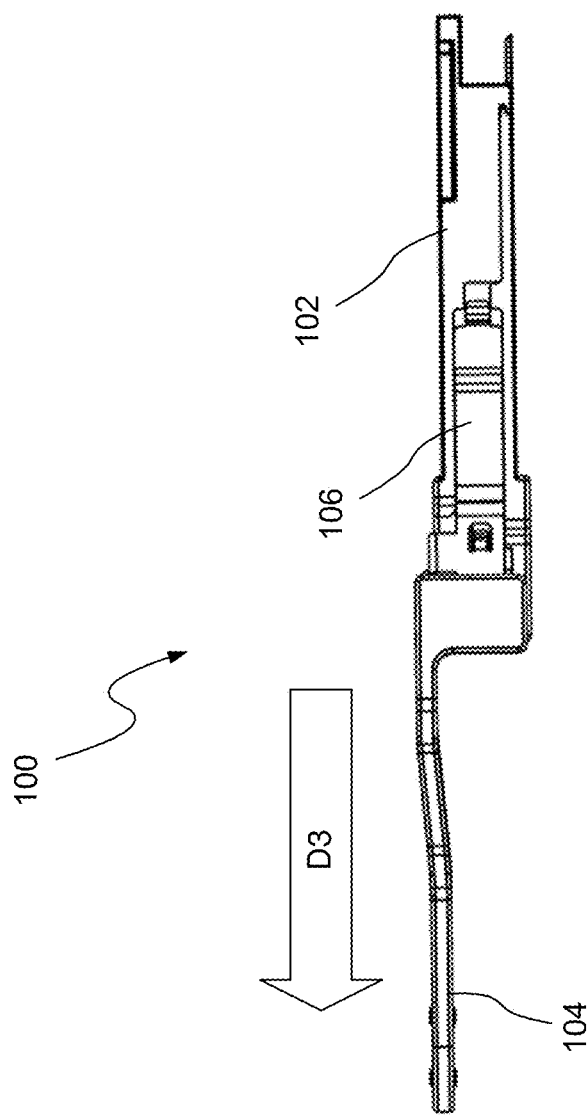
FIG. 7 shows a side view of the optical transceiver module of FIG. 1 in accordance with an embodiment.

The second end of each of the first and second locking arms 130-1, 130-2 further provide first and second lock members 138-1, 138-2. The first and second locking members 138-1, 138-2 preferably include a generally arcuate portion that extends away from the housing 102 when the lock actuator 106 is coupled thereto. The first and second locking members 138-1, 138-2 can lock the housing 102 into a receptacle of a transceiver cage. In this locked orientation, the housing 102 is prevented from being removed inadvertently from the transceiver cage. A user may transition the housing 102 from the locked orientation to the unlocked orientation by, for instance, supplying a pulling force to the handle member 104 along direction D3 as shown in FIG. 7 to cause the same to displace the lock actuator 106, and thus by extension, the first and second locking members 138-1, 138-2 (See FIG. 2). The displaced first and second locking members 138-1, 138-2 may then engage a surface of the transceiver cage (not shown) that causes the same to be biased inwards towards the housing 102 to transition to the unlocked orientation and allow for a user to remove the housing 102 from the transceiver cage.

Figure 5:
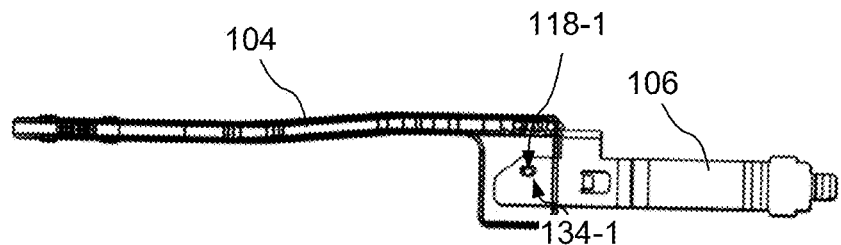
FIG. 5 shows a side view of the handle member of FIG. 3 coupled to the lock actuator of FIG. 4 in a first orientation, in accordance with an embodiment.
Figure 6:
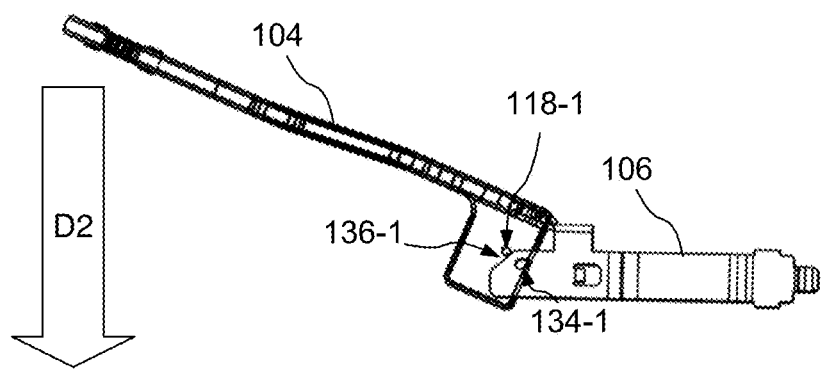
FIG. 6 shows another side view of the handle member of FIG. 3 coupled to the lock actuator of FIG. 4 in a second orientation, in accordance with an embodiment.

Additional aspects and features of the foregoing may be better understood with reference to FIGS. 5 and 6 which show the handle member 104 and lock actuator 106 in isolation. In addition, the handle member 104 is shown as transparent for purposes of clarity. FIG. 5 shows an example of the handle member 104 in the first orientation, e.g., extending substantially parallel with the arms of the lock actuator 106 and/or the housing 102 (See also FIG. 1). In the first orientation, the first and second projections 118-1, 118-2 of the handle member 104 extend into the engagement slots 118-1, 118-2 of the lock actuator 106. For instance, and as shown in FIG. 5, the first projection 118-1 extends at least partially through the first engagement slot 134-1. Preferably, each of the first and second projections 118-1, 118-2 are biased towards the lock actuator 106 based on, for instance, the offset distance D1 that induces the bias force F1 as discussed above. Thus, the handle member 104 may therefore be maintained in the first orientation in the absence of a user supplied force based at least in part on the first and second projections 118-1, 118-2 being disposed within a respective engagement slot and (directly) engaging the corresponding engagement surface of the first and second engagement slots 134-1, 134-2.

In FIG. 6, the handle member 104 is shown in the second orientation, with the second orientation including the handle member 104 extending from the lock actuator 106 (and thus by extension the housing 102 when coupled thereto) at an angle of about 22±15 degrees, and preferably an angle of 22±5 degrees. Preferably, the second orientation includes the first and second projections 118-1, 118-2 of the handle member 104 (directly) engaging angled engagement surfaces 136-1, 136-2 (See FIG. 2). For example, and as shown in FIG. 6, the first projection 118-1 of the handle member 104 directly engages the first angled engagement surface 136-1, with the first angled engagement surface 136-1 providing a mechanical stop. A user may then supply a force along direction D2 to cause the handle member 104 to rotate relative to the lock actuator 106. The rotation may then cause the first and second projections 118-1, 118-2 to be displaced by the outer surfaces defining the lock actuator 106. This displacement may then generate a spring tension between the first and second projections and the lock actuator 106 that advantageously allows the handle member 104 to be maintained via resulting friction at a user-selected angle without the presence of a user-supplied force. In addition, this displacement of the first and second projections 118-1, 118-2 can provide tactile feedback to a user when the handle member 104 is transitioned to the first orientation and the first and second projections 118-1, 118-2 "click" into the first and second engagement slots 134-1, 134-2, respectively.

Figure 8A:
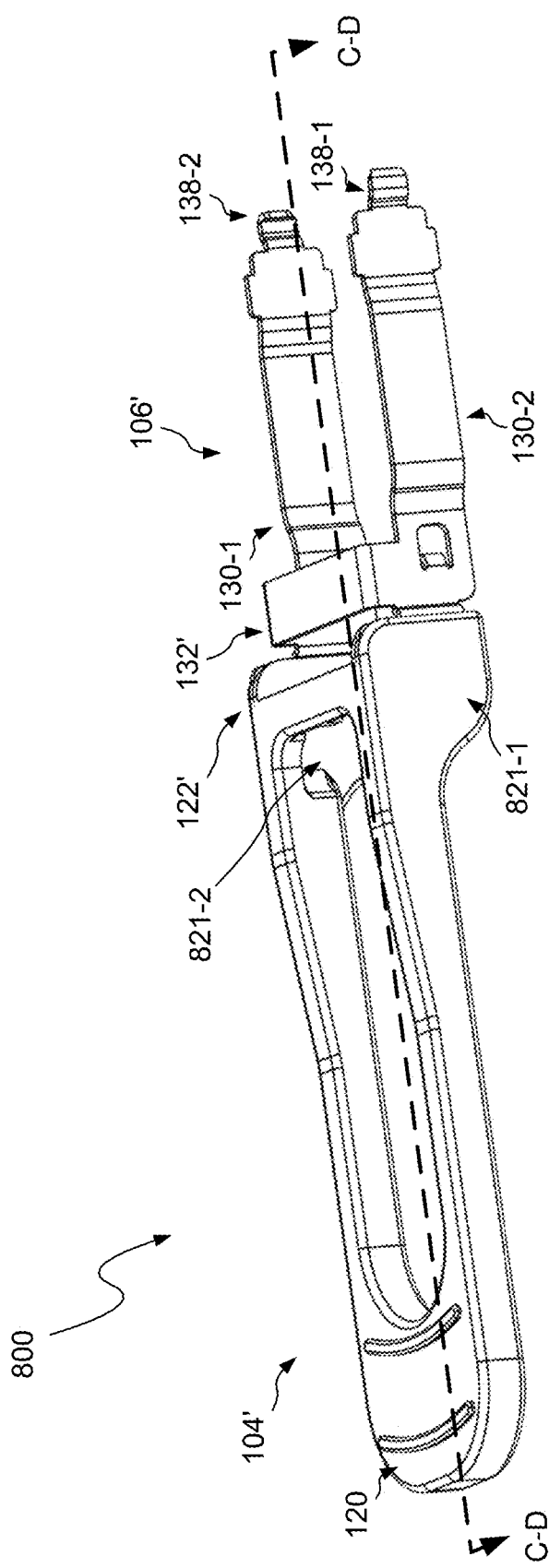
FIG. 8A shows another lock actuator and handle member suitable for use with the optical transceiver module of FIG. 1, in accordance with an embodiment of the present disclosure.
Figure 8B:
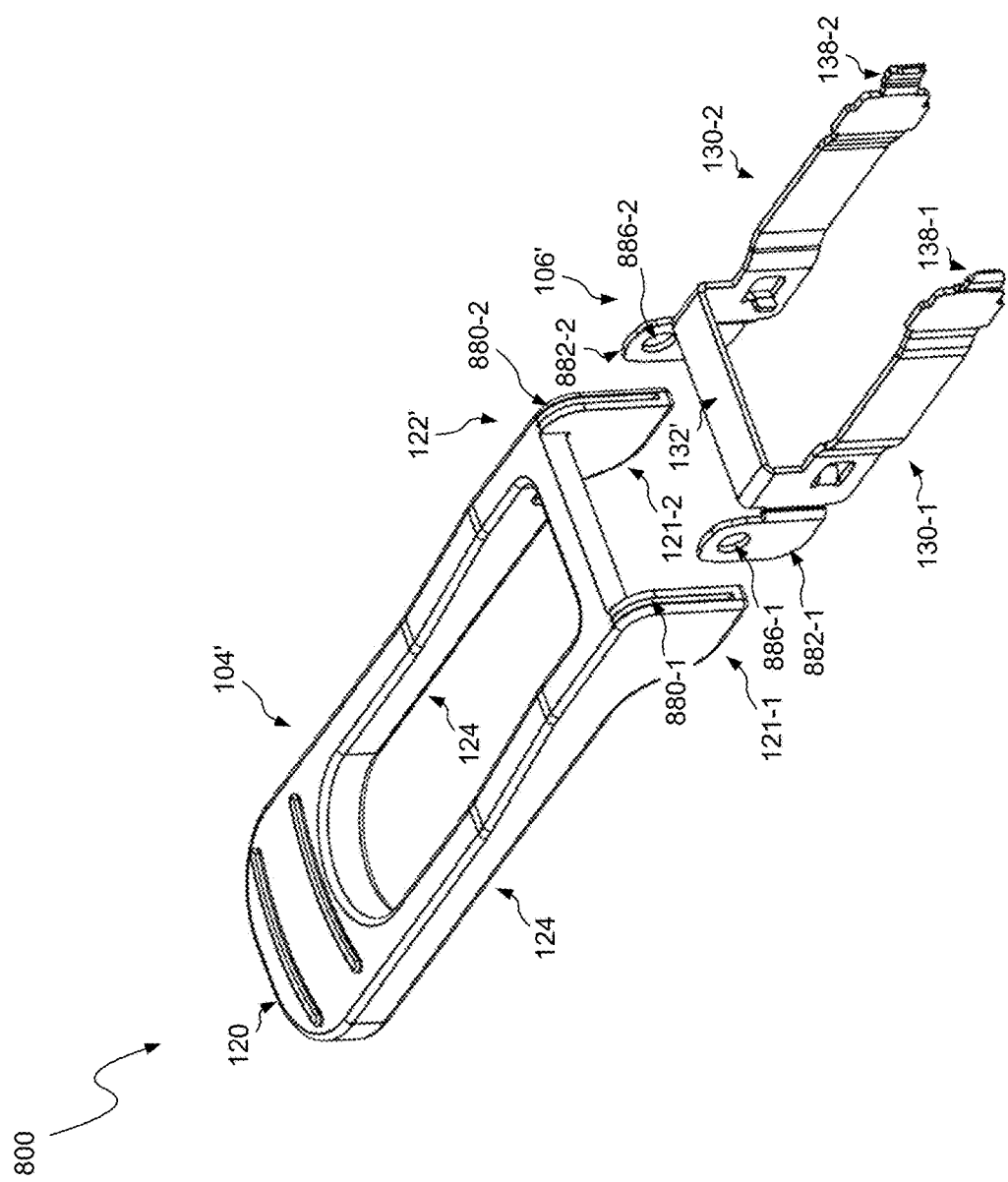
FIG. 8B shows a perspective view of the lock actuator and handle member of FIG. 8A in accordance with an embodiment of the present disclosure.
Figure 8C:
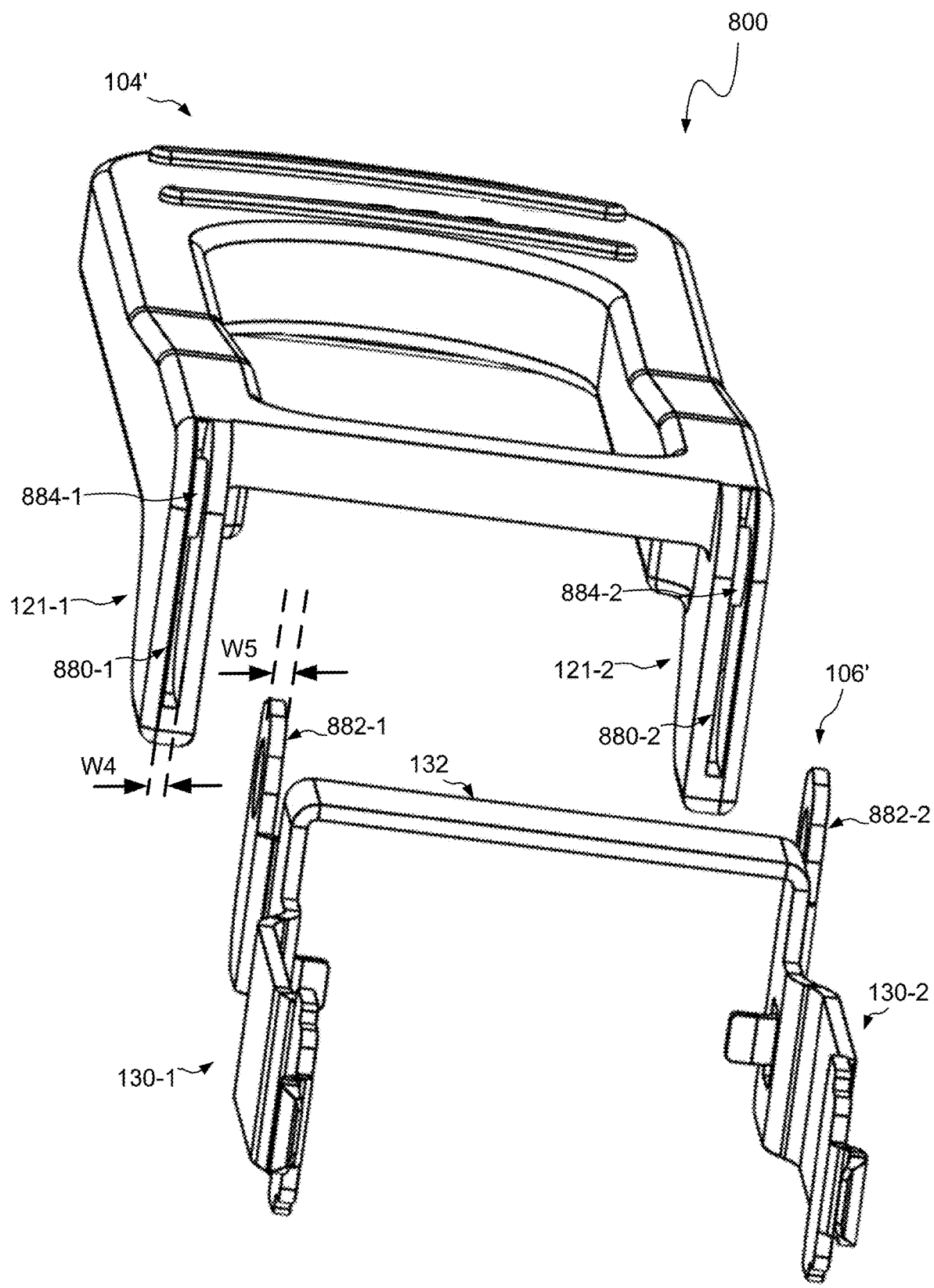
FIG. 8C shows another perspective view of the lock actuator and handle member of FIG. 8A in accordance with an embodiment of the present disclosure.

FIGS. 8A-8C collectively shown an example embodiment of a locking arrangement 800 consistent with aspects of the present disclosure. Note, like reference numerals refer to like elements between the locking arrangement 800 and the locking arrangement collectively provided by handle member 104 and lock actuator 106 as shown and described above with regard to FIGS. 1-7.

The locking arrangement 800 includes a handle member 104' and a lock actuator 106'. The handle member 104' and the lock actuator 106' may be utilized with the optical transceiver module 100 of FIG. 1 as discussed above, and can be configured to operate substantially similar to that of the handle member 104 and the lock actuator 106 to transition the housing 102 between locked and unlocked orientations within a transceiver cage or other suitable enclosure, the description of which is equally applicable to the locking arrangement 800 and will not be repeated for brevity.

However, as shown in the FIG. 8A, the locking arrangement 800 includes a handle member 104' that provides an internal hinge to rotatably couple to the lock actuator 106', and thus by extension, the housing 102. In particular, the handle member 104' includes a coupling region 122' that includes first and second arms 821-1, 821-2. The first and second arms 821-1, 821-2 define first and second slots 880-1, 880-2, respectively (See FIG. 8C). The first and second slots 880-1, 880-2 are configured to receive first and second handle coupling members 882-1, 882-2, respectively, provided by the first and second arms 138-1, 138-2 of the lock actuator 106' (See FIG. 8B). The first and second arms 138-1, 138-2 preferably extend substantially parallel with each other and transverse relative to the adjoining portion 132'. The first and second handle coupling members 882-1, 882-2 preferably extend substantially parallel with the first and second arms 138-1, 138-2. The first and second handle coupling members 882-1, 882-2 may thus extend from the first and second arms 138-1, 138-2, e.g., as shown in FIG. 8B, and/or can extend from the adjoining portion 132'.

Preferably, the first and second slots 880-1, 880-2 include an overall width W4 that is equal to or larger than the overall outer width W5 of the first and second handle coupling members 882-1, 882-2 (See FIG. 8C). More preferably, the first and second slots 880-1, 880-2 include a profile that corresponds with the shape/profile of the first and second handle coupling members 882-1, 882-2.

As shown in FIG. 8C, the first and second slots 880-1, 880-2 preferably include first and second projections 884-1, 884-2 respectively disposed therein. The first and second projections 884-1, 884-2 may also be referred to herein as first and second shafts or axles. The first and second projections 884-1, 884-2 preferably include a substantially cylindrical body such as shown in FIG. 8C. The first and second handle coupling members 882-1, 882-2 also preferably include first and second openings 886-1, 886-2, respectively. The first and second openings 886-1, 886-2 can include a diameter that is substantially equal to or greater than the diameter of the first and second projections 884-1, 884-2. Thus, the first and second openings 886-1, 886-2 can be configured to receive respective ones of the first and second projections 884-1, 884-2 when the first and second handle coupling members 882-1, 882-2 are disposed within the first and second slots 880-1, 880-2 of the handle member '104.

Figure 9:
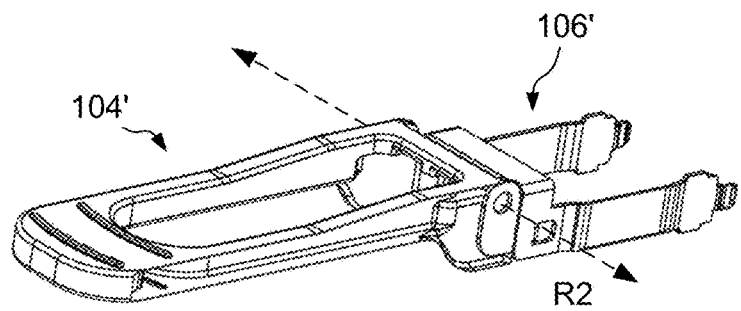
FIG. 9 shows another cross-sectional view of the handle member and lock actuator of FIG. 8A taken along line C-D, in accordance with an embodiment of the present disclosure.

Thus, in this preferred example configuration, the handle member 104' provides an internal hinge based on the first and second handle coupling members being disposed within the first and second slots 880-1, 880-2 of the handle member 104' and the first and second projections 884-1, 884-2 being disposed at least partially within the first and second openings 886-1, 886-2 of the lock actuator 106'. The locking arrangement 800 can therefore define an axis of rotation R2 (see FIG. 9) about which the handle member 104' can rotate relative to the housing 102 (See FIG. 1) based on the internal hinge provided at least in part by the first and second projections 884-1, 884-2 of the first and second slots 880-1, 880-2. Thus, an imaginary line drawn along the axis of rotation R2 intersects with the first and second projections 884-1, 884-2 and extends through the first and second openings 886-1, 886-2 of the lock actuator 106'. The axis of rotation R2 may also be referred to as a second axis of rotation.

Figure 8D:
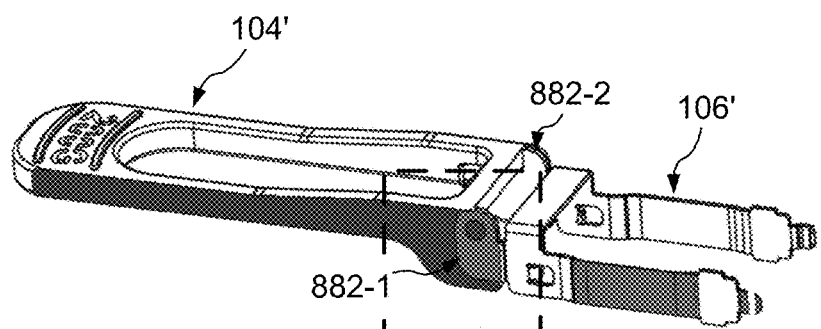
FIG. 8D shows a cross-sectional view of the handle member and lock actuator of FIG. 8A taken along line C-D, in accordance with an embodiment of the present disclosure.
Figure 8E:
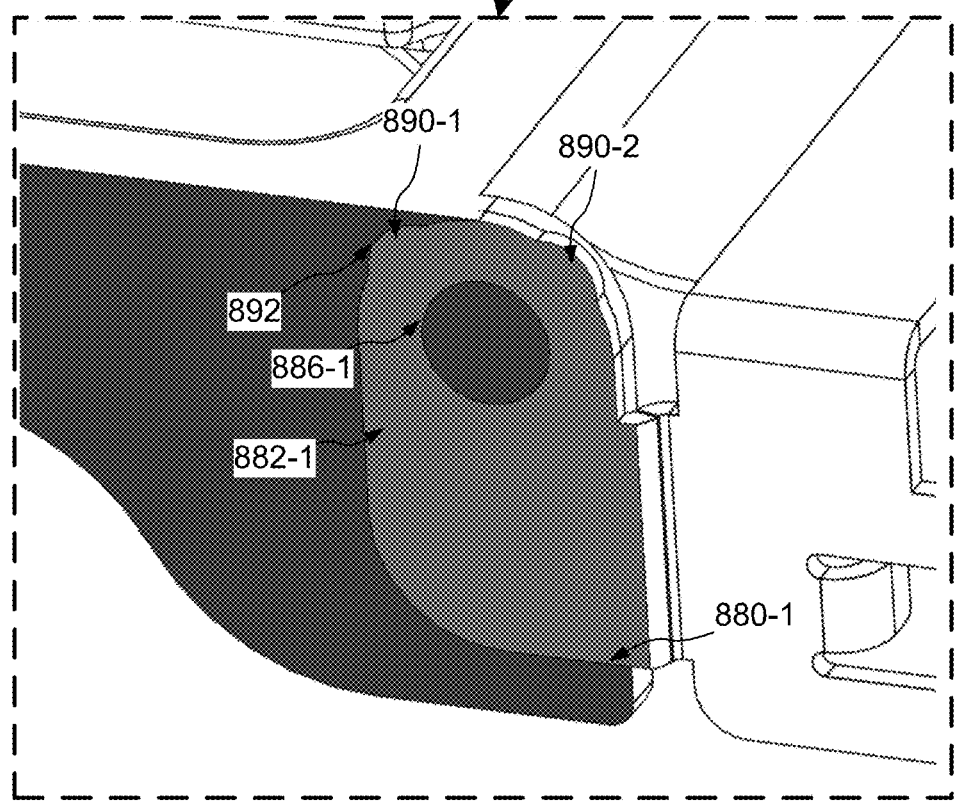
FIG. 8E shows an enlarged portion of the cross-sectional view of FIG. 8D, in accordance with an embodiment of the present disclosure.

Turning specifically to FIG. 8D a cross-sectional view of the handle member 104' taken along the line C-D of FIG. 8A is shown in accordance with an embodiment of the present disclosure. As shown in FIG. 8D, each of the first and second handle coupling members 882-1, 882-2, include at least one protrusion/projection extending therefrom. For example, FIG. 8E shows an enlarged region of the cross-sectional view of FIG. 8D. As shown, the first handle coupling member 882-1 preferably includes at least a first protrusion 890-1, and more preferably, at least the first protrusion 890-1 and a second protrusion 890-2. The first and second protrusions 890-1, 890-2 preferably include an arcuate profile, such as shown in FIG. 8E.

Figure 10:
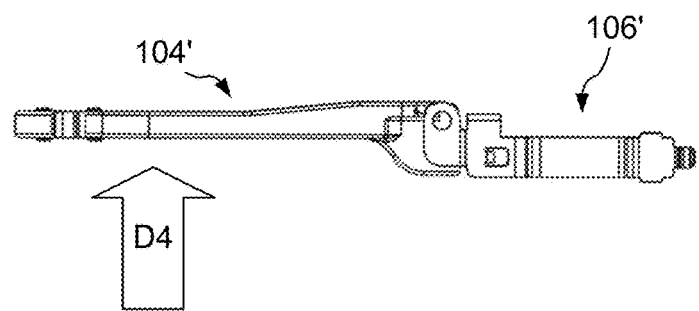
FIG. 10 shows another cross-sectional view of the handle member and lock actuator of FIG. 8A taken along line C-D, in accordance with an embodiment of the present disclosure.

Each of the first and second slots 880-1, 880-2 of the handle member 104' preferably include at least one recess/groove with a shape/profile corresponding to the first and second protrusions 890-1, 890-2. For example, as shown in FIG. 8E, the first slot 880-1 defines recess 892. Recess 892 is configured to receive at least the first protrusion 890-1 and maintain the handle member 104' at the first orientation whereby the handle member 104' extends substantially parallel with the lock actuator 106' (see e.g., FIG. 10) and/or housing 102 (See FIG. 1) such that the handle member 104' remains in the first orientation in the absence of a user-supplied force.

Figure 11:
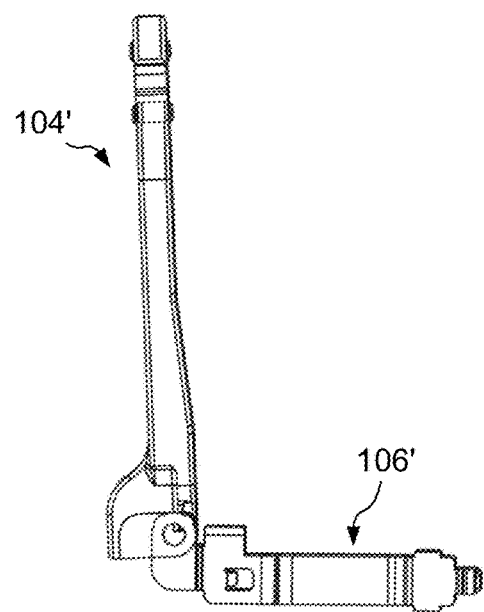
FIG. 11 shows another cross-sectional view of the handle member and lock actuator of FIG. 8A taken along line C-D, in accordance with an embodiment of the present disclosure.

More preferably, the first and second protrusions 890-1, 890-2 can be disposed offset from each other at a predefined distance such that the second protrusions 890-2 can be disposed within the recess 892 when the handle member 104' is in the second orientation, such as shown in FIG. 11. Thus, a user can supply force along direction D4 (see FIG. 10) to displace the first protrusion 890-1 from the recess 892 (See FIG. 8E) and allow for rotation of the handle member 104' about the axis of rotation R2 (See FIG. 9). The user may then transition the handle member 104' to the second orientation as shown in FIG. 11, and in response thereto, the second protrusion 890-2 can be disposed in the recess 892.

The handle member 104' may then preferably remain in the second orientation in the absence of a user-supplied force based on the second protrusion 890-2 being disposed within the recess 892. The recess 892 may therefore provide a mechanical stop to maintain the handle member 104' at the first or second orientation, depending on a user's desire. In addition, the first and/or second protrusions 890-1, 890-2 and recess 892 can be also described as a tongue and groove arrangement. Note, the second handle coupling member 882-2 of the lock actuator 106' and second slot 880-2 of the handle member 104' preferably include a substantially similar configuration, e.g., also provide one or more protrusions on the second handle coupling member 882-2 and corresponding recess within the second slot 880-2 of the handle member 104', to provide a tongue and groove arrangement.

Thus, each of the first and second handle coupling members 882-1, 882-1 preferably include a substantially symmetrical shape and each include, for example, first and second projections as shown and described above with regard to FIG. 8E. As further shown in FIGS. 8D and 8E, the first protrusion of each of the first and second handle coupling members, e.g., first protrusion 890-1, may be configured to remain disposed within respective ones of the first and second slots 880-1, 880-2 when the handle member 104' is in the first and second orientation. On the other hand, the second protrusion (e.g., second protrusion 890-2) of each of the first and second handle coupling members 882-1, 882-2 can be configured to be external from a respective one of the first and second slots 880-1, 880-2 when the handle member 104' is in the first orientation, and disposed within a respective one of the first and second slots 880-1, 880-2 when the handle member 104' is in the second orientation.

Figure 12:
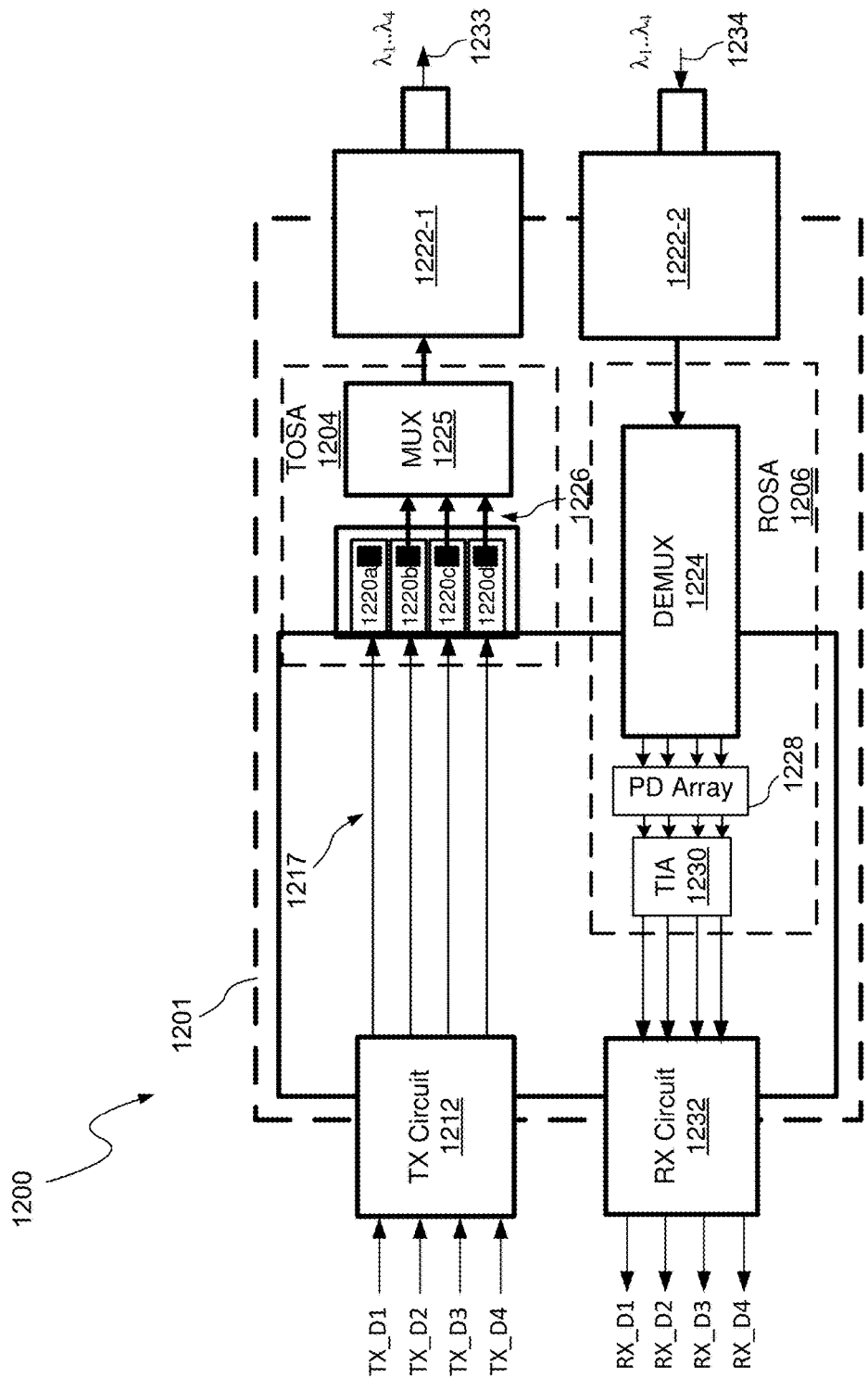
FIG. 12 shows a block diagram of an example optical transceiver system in accordance with an embodiment of the present disclosure.

Turning to FIG. 12, an optical transceiver system 1200, consistent with embodiments of the present disclosure, is shown and described. In this embodiment, the optical transceiver system 1200 transmits and receives four (4) channels using four different channel wavelengths ($\lambda1$, $\lambda2$, $\lambda3$, $\lambda4$) and may be capable of transmission rates of at least about 25 Gbps per channel. In one example, the channel wavelengths $\lambda1$, $\lambda2$, $\lambda3$, $\lambda4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver system 1200 may also be capable of transmission distances of 2 km to at least about 10 km. The optical transceiver system 1200 may be used, for example, in internet data center applications or fiber to the home (FTTH) applications.

Preferably, the optical transceiver system 1200 includes a housing 1201 configured consistent with aspects of the present disclosure. For example, the housing 1201 may be implemented as the housing 102 of the optical transceiver module 100 discussed above.

As shown, optical transceiver system 1200 includes a transmitter optical subassembly (TOSA) arrangement 1204 having a plurality of laser arrangements 1220a-d for transmitting optical signals on different channel wavelengths and a multi-channel receiver optical subassembly (ROSA) 1206 for receiving optical signals having multiple different channel wavelengths. The multi-channel ROSA 1206 may also be referred to herein as a ROSA arrangement. The TOSA arrangement 1204 and the multi-channel ROSA 1206 are preferably located within the housing 1201.

As further shown, the optical transceiver system 1200 includes a transmit connecting circuit 1212 and a receive connecting circuit 1232 that provide electrical connections to the TOSA arrangement 1204 and the multi-channel ROSA 1206, respectively, within the housing 1201. The transmit connecting circuit 1212 is electrically connected to the electronic components in each of the laser arrangements 1220a-d and the receive connecting circuit 1232 is electrically connected to the electronic components (e.g., photodiodes, TIA(s), etc.) in the multi-channel ROSA 1206. The transmit connecting circuit 1212 and the receive connecting circuit 1232 may be flexible printed circuits (FPCs) including at least conductive paths to provide electrical connections and may also include additional circuitry. Preferably, the transmit and receive connecting circuits 1212, 1232 are implemented at least in part in on the printed circuit board 107 (See FIG. 1).

The TOSA arrangement 1204 preferably electrically couples to the transmit connecting circuit 1212 via electrically conductive paths 1217 and is configured to receive driving signals (e.g., TX_D1 to TX_D4) and launch channel wavelengths 1226 on to fiber(s) of the transmit optical fibers 1233 via multiplexing device 1225 and optical coupling port 1222-1.

Continuing on, the example multi-channel ROSA 1206 shown in FIG. 12 includes a demultiplexer 1224 optically coupled to optical coupling port 1222-2 to receive an optical signal having a plurality of multiplexed channel wavelengths via receive optical fiber 1234. An output of the demultiplexer 1224 is optically coupled to a photodiode array 1228. The multi-channel ROSA 1206 also includes a transimpedance amplifier 1230 electrically connected to the photodiode array 1228. The photodiode array 1228 and the transimpedance amplifier 1230 detect and convert optical signals received from the demultiplexer 1224 into electrical data signals (RX_D1 to RX_D4) that are output via the receive connecting circuit 1232.

In accordance with an aspect, an optical module is disclosed. The optical module comprising a pluggable housing defining a cavity to receive an optical component, the pluggable housing configured to removably couple into a receptacle of an equipment cage, and a locking arrangement coupled to the pluggable housing to allow the pluggable housing to releasably lock within the receptacle, the locking arrangement including a lock actuator coupled to the pluggable housing and configured to transition the pluggable housing between a locked and unlocked orientation, the locked orientation to prevent removal of the pluggable housing from the receptacle of the equipment cage and the unlocked orientation to allow removal of the pluggable housing from the receptacle of the equipment cage, and a handle member rotatably coupled to the lock actuator and configured to rotate relative to the pluggable housing to transition the handle member between at least a first orientation and a second orientation, and wherein the handle member is configured to maintain the handle member at the first orientation or the second orientation based on a bias force supplied by the handle member against the lock actuator.

In accordance with another aspect of the present disclosure an optical transceiver module is disclosed. The optical transceiver module comprising a pluggable housing configured to removably couple into a receptacle of an optical transceiver cage, and a locking arrangement coupled to the pluggable housing to allow the pluggable housing to releasably lock within the receptacle, the locking arrangement including a lock actuator coupled to the pluggable housing and configured to transition the pluggable housing between a locked and unlocked orientation, the locked orientation to prevent removal of the pluggable housing from the receptacle of the optical transceiver cage and the unlocked orientation to allow removal of the pluggable housing from the receptacle of the optical transceiver cage, the lock actuator having an overall outer width W2, a handle member rotatably coupled to the lock actuator and configured to rotate relative to the pluggable housing to transition the handle member between at least a first orientation and a second orientation, the handle member providing first and second arms that extend substantially parallel relative to each other and define a slot therebetween, the slot being configured with an overall width W1 to receive the lock actuator, and wherein the handle member is configured to remain at the first orientation based on the lock actuator being at least partially received within the slot and the first and second arms of the handle member supplying a bias force against a portion of the lock actuator within the slot based on the overall width W1 of the slot of the handle member being less than the overall outer width W2 of the lock actuator, a transmitter optical subassembly (TOSA) arrangement disposed in the pluggable housing, and a receiver optical subassembly (ROSA) arrangement disposed in the pluggable housing.

In accordance with another aspect an optical module is disclosed. The optical module comprising a pluggable housing defining a cavity to receive an optical component, the pluggable housing configured to removably couple into a receptacle of an equipment cage, and a locking arrangement coupled to the pluggable housing to allow the pluggable housing to releasably lock within the receptacle, the locking arrangement including a lock actuator coupled to the pluggable housing and configured to transition the pluggable housing between a locked orientation and an unlocked orientation, the locked orientation to prevent removal of the pluggable housing from the receptacle of the equipment cage and the unlocked orientation to allow removal of the pluggable housing from the receptacle of the equipment cage, and wherein the lock actuator includes first and second handle coupling members extending therefrom that define an axis of rotation R2, and a handle member defining first and second slots to receive the first and second handle coupling members of the lock actuator, respectively, therein and rotate about the axis of rotation R2 to transition the handle member between at least a first orientation and a second orientation.

In accordance with another aspect of the present disclosure an optical transceiver module is disclosed. The optical transceiver module including a pluggable housing configured to removably couple into a receptacle of an optical transceiver cage, and a locking arrangement coupled to the pluggable housing to allow the pluggable housing to releasably lock within the receptacle, the locking arrangement including a lock actuator coupled to the pluggable housing and configured to transition the pluggable housing between a locked orientation and an unlocked orientation, the locked orientation to prevent removal of the pluggable housing from the receptacle of the optical transceiver cage and the unlocked orientation to allow removal of the pluggable housing from the receptacle of the optical transceiver cage, and wherein the lock actuator includes first and second handle coupling members extending therefrom that define an axis of rotation R2, and a handle member providing an internal hinge based at least in part on first and second slots defined by the handle member, the first and second slots configured to receive the first and second handle coupling members of the lock actuator, respectively, and define an axis of rotation R2 about which the handle member rotates to transition between at least a first orientation and a second orientation, a transmitter optical subassembly (TOSA) arrangement disposed in the pluggable housing, and a receiver optical subassembly (ROSA) arrangement disposed in the pluggable housing.

While the principles of the invention have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A optical module comprising:
a pluggable housing defining a cavity to receive an optical component, the pluggable housing configured to removably couple into a receptacle of an equipment cage; and
a locking arrangement coupled to the pluggable housing to allow the pluggable housing to releasably lock within the receptacle, the locking arrangement including:
a lock actuator coupled to the pluggable housing and configured to transition the pluggable housing between a locked orientation and an unlocked orientation, the locked orientation to prevent removal of the pluggable housing from the receptacle of the equipment cage and the unlocked orientation to allow removal of the pluggable housing from the receptacle of the equipment cage, and wherein the lock actuator includes first and second handle coupling members extending therefrom that define an axis of rotation R2; and
a handle member defining first and second slots to receive the first and second handle coupling members of the lock actuator, respectively, therein and rotate about the axis of rotation R2 to transition the handle member between at least a first orientation and a second orientation;
wherein the first slot includes a first projection disposed therein and the second slot includes a second projection disposed therein, and wherein an imaginary line drawn along the axis of rotation R2 intersects with the first and second projections of the first and second slots, respectively, when the first and second handle coupling members are disposed within the first and second slots of the handle member, respectively.

2. The optical module of claim 1, wherein the first and second projections of the first and second slots include a substantially cylindrical body.

3. The optical module of claim 1, wherein the first handle coupling member of the lock actuator defines a first opening and the second handle coupling member of the lock actuator defines a second opening, the first and second openings to receive the first and second projections, respectively, to rotatably couple the handle member to the lock actuator and allow the handle member to rotate about the axis of rotation R2.

4. The optical module of claim 1, wherein the first orientation includes the handle member extending substantially parallel with a longitudinal axis of the pluggable housing, and the second orientation includes the handle member extending substantially transverse relative to the longitudinal axis of the pluggable housing.

5. The optical module of claim 1, wherein the first handle coupling member includes at least a first protrusion and the first slot includes a corresponding recess to receive the first protrusion of the first handle coupling member, and wherein the first handle member is configured to remain at the first orientation in an absence of a user-supplied force based on the first protrusion of the first handle coupling member being disposed within the recess of the first slot.

6. The optical module of claim 5, wherein the first protrusion of the first handle coupling member is configured to be disposed within the first slot of the handle member when the first handle member is in the first orientation and the second orientation.

7. A optical module comprising:
a pluggable housing defining a cavity to receive an optical component, the pluggable housing configured to removably couple into a receptacle of an equipment cage; and
a locking arrangement coupled to the pluggable housing to allow the pluggable housing to releasably lock within the receptacle, the locking arrangement including:
a lock actuator coupled to the pluggable housing and configured to transition the pluggable housing between a locked orientation and an unlocked orientation, the locked orientation to prevent removal of the pluggable housing from the receptacle of the equipment cage and the unlocked orientation to allow removal of the pluggable housing from the receptacle of the equipment cage, and wherein the lock actuator includes first and second handle coupling members extending therefrom that define an axis of rotation R2; and
a handle member defining first and second slots to receive the first and second handle coupling members of the lock actuator, respectively, therein and rotate about the axis of rotation R2 to transition the handle member between at least a first orientation and a second orientation;
wherein the first handle coupling member includes at least a first protrusion and the first slot includes a corresponding recess to receive the first protrusion of the first handle coupling member, and wherein the first handle member is configured to remain at the first orientation in an absence of a user-supplied force based on the first protrusion of the first handle coupling member being disposed within the recess of the first slot;
wherein the first handle coupling member defines a second protrusion, and wherein the second protrusion is configured to be disposed within the recess of the first slot based on the handle member being rotated and transitioned to the second orientation, and wherein the handle member remains in the second orientation in the absence of a user-supplied force based on the second protrusion being disposed within the recess of the first slot.

8. The optical module of claim 7, wherein the second protrusion of the first handle coupling member is configured to be disposed external from the first slot of the handle member when the handle member is in the first orientation.

9. The optical module of claim 7, wherein the first and second protrusions include an arcuate profile.

10. The optical module of claim 7, and wherein the recess of the first slot of the first handle coupling member provides a mechanical stop such that, when the handle member is in the first orientation, the first protrusion remains within the recess of the first slot until a user-supplied force causes the handle member to rotate and displace the first protrusion from the recess.

11. An optical transceiver module comprising:
a pluggable housing configured to removably couple into a receptacle of an optical transceiver cage; and
a locking arrangement coupled to the pluggable housing to allow the pluggable housing to releasably lock within the receptacle, the locking arrangement including:
a lock actuator coupled to the pluggable housing and configured to transition the pluggable housing between a locked orientation and an unlocked orientation, the locked orientation to prevent removal of the pluggable housing from the receptacle of the optical transceiver cage and the unlocked orientation to allow removal of the pluggable housing from the receptacle of the optical transceiver cage, and wherein the lock actuator includes first and second handle coupling members extending therefrom that define an axis of rotation R2; and
a handle member providing an internal hinge based at least in part on first and second slots defined by the handle member, the first and second slots configured to receive the first and second handle coupling members of the lock actuator, respectively, and define an axis of rotation R2 about which the handle member rotates to transition between at least a first orientation and a second orientation;
a transmitter optical subassembly (TOSA) arrangement disposed in the pluggable housing; and
a receiver optical subassembly (ROSA) arrangement disposed in the pluggable housing;
wherein the first slot includes a first projection disposed therein and the second slot includes a second projection disposed therein, and wherein an imaginary line drawn along the axis of rotation R2 intersects with the first and second projections of the first and second slots, respectively, when the first and second handle coupling members are disposed within the first and second slots of the handle member, respectively.

12. The optical transceiver module of claim 11, wherein the first and second projections of the first and second slots include a substantially cylindrical body.

13. The optical transceiver module of claim 11, wherein the first handle coupling member of the lock actuator defines a first opening and the second handle coupling member of the lock actuator defines a second opening, the first and second openings to receive the first and second projections, respectively, to rotatably couple the handle member to the lock actuator and allow the handle member to rotate about the axis of rotation R2.

14. The optical transceiver module of claim 11, wherein the first orientation includes the handle member extending substantially parallel with a longitudinal axis of the pluggable housing, and the second orientation includes the handle member extending substantially transverse relative to the longitudinal axis of the pluggable housing.

15. The optical transceiver module of claim 11, wherein the first handle coupling member includes at least a first protrusion and the first slot includes a corresponding recess to receive the first protrusion of the first handle coupling member, and wherein the first handle member is configured to remain at the first orientation in an absence of a user-supplied force based on the first protrusion of the first handle coupling member being disposed within the recess of the first slot.

16. An optical transceiver module comprising:
- a pluggable housing configured to removably couple into a receptacle of an optical transceiver cage; and
- a locking arrangement coupled to the pluggable housing to allow the pluggable housing to releasably lock within the receptacle, the locking arrangement including:
  - a lock actuator coupled to the pluggable housing and configured to transition the pluggable housing between a locked orientation and an unlocked orientation, the locked orientation to prevent removal of the pluggable housing from the receptacle of the optical transceiver cage and the unlocked orientation to allow removal of the pluggable housing from the receptacle of the optical transceiver cage, and wherein the lock actuator includes first and second handle coupling members extending therefrom that define an axis of rotation R2; and
  - a handle member providing an internal hinge based at least in part on first and second slots defined by the handle member, the first and second slots configured to receive the first and second handle coupling members of the lock actuator, respectively, and define an axis of rotation R2 about which the handle member rotates to transition between at least a first orientation and a second orientation;
- a transmitter optical subassembly (TOSA) arrangement disposed in the pluggable housing; and
- a receiver optical subassembly (ROSA) arrangement disposed in the pluggable housing;
- wherein the first handle coupling member includes at least a first protrusion and the first slot includes a corresponding recess to receive the first protrusion of the first handle coupling member, and wherein the first handle member is configured to remain at the first orientation in an absence of a user-supplied force based on the first protrusion of the first handle coupling member being disposed within the recess of the first slot;
- wherein the first protrusion of the first handle coupling member is configured to be disposed within the first slot of the handle member when the first handle member is in the first orientation and the second orientation, and wherein the first handle coupling member defines a second protrusion, and wherein the second protrusion is configured to be disposed within the recess of the first slot based on the handle member being rotated and transitioned to the second orientation, and wherein the handle member remains in the second orientation in the absence of a user-supplied force based on the second protrusion being disposed within the recess of the first slot.

17. The optical transceiver module of claim 16, and wherein the recess of the first slot of the first handle coupling member provides a mechanical stop such that, when the handle member is in the first orientation, the first protrusion remains within the recess of the first slot until a user-supplied force causes the handle member to rotate and displace the first protrusion from the recess.

* * * * *